(12) United States Patent
Hillen

(10) Patent No.: US 11,269,348 B2
(45) Date of Patent: Mar. 8, 2022

(54) METHOD FOR OPERATING AN AUTOMATICALLY MOVING SERVICE DEVICE

(71) Applicant: Vorwerk & Co. Interholding GmbH, Wuppertal (DE)

(72) Inventor: Lorenz Hillen, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 369 days.

(21) Appl. No.: 16/033,340

(22) Filed: Jul. 12, 2018

(65) Prior Publication Data

US 2019/0018424 A1  Jan. 17, 2019

(30) Foreign Application Priority Data

Jul. 13, 2017 (DE) ...................... 10 2017 006 621.3
Jul. 3, 2018 (DE) ...................... 10 2018 116 065.8

(51) Int. Cl.
*G05D 1/02* (2020.01)
*G01C 21/32* (2006.01)
(Continued)

(52) U.S. Cl.
CPC ......... *G05D 1/0274* (2013.01); *G01C 21/206* (2013.01); *G01C 21/32* (2013.01);
(Continued)

(58) Field of Classification Search
CPC .. G05D 1/0274; G05D 1/0246; G05D 1/0238; G05D 2201/0203; G01C 21/206;
(Continued)

(56) References Cited

U.S. PATENT DOCUMENTS 5,220,263 A * 6/1993 Onishi ............. G05B 19/41895
180/168
8,380,350 B2  2/2013 Ozick et al.
(Continued)

FOREIGN PATENT DOCUMENTS

DE  10 2008 014 912 A1  9/2009
DE  10 2011 000 536 A1  8/2012
(Continued)

*Primary Examiner* — Stephen Holwerda
(74) *Attorney, Agent, or Firm* — Collard & Roe, P.C.

(57) ABSTRACT

A method for operating an automatically moving service device includes detecting obstacles within an environment with a detection device. The detection results are used to generate an environment map of the environment, and the service device moves within the environment based on the environment map. A control device of the service device receives information about a spatial position of a base station in the environment, and a maneuvering area for the service device to approach, turn toward and/or dock with the base station is determined. The spatial position and maneuvering area are stored in the environment map and a turning point for a directional change is prescribed within the maneuvering area. The service device can execute a last directional change at this turning point at the latest and independently of the remaining progression of movement, before it moves along a straight line toward the base station.

8 Claims, 7 Drawing Sheets

(51) Int. Cl.
*G01C 21/20* (2006.01)
*G01S 17/931* (2020.01)
*G01S 17/93* (2020.01)
*G01S 17/89* (2020.01)
*G01S 17/48* (2006.01)

(52) U.S. Cl.
CPC .......... *G01S 17/931* (2020.01); *G05D 1/0246* (2013.01); *A47L 2201/04* (2013.01); *G01S 17/48* (2013.01); *G01S 17/89* (2013.01); *G01S 17/93* (2013.01); *G05D 1/0238* (2013.01); *G05D 2201/0203* (2013.01)

(58) Field of Classification Search
CPC ....... G01C 21/32; G01S 17/931; G01S 17/89; G01S 17/93; G01S 17/48; A47L 2201/04
See application file for complete search history.

(56) References Cited

U.S. PATENT DOCUMENTS

| | | |
|---|---|---|
| 8,874,261 B2 | 10/2014 | Hein et al. |
| 8,918,208 B1 | 12/2014 | Hickman et al. |
| 8,935,006 B2 | 1/2015 | Vu et al. |
| 9,229,454 B1 | 1/2016 | Chiappetta et al. |
| 9,656,390 B2 | 5/2017 | Telling |
| 9,682,481 B2 | 6/2017 | Lutz et al. |
| 9,896,315 B2 | 2/2018 | High et al. |
| 10,286,547 B2 | 5/2019 | Takaichi et al. |
| 10,399,230 B2 | 9/2019 | Shah et al. |
| 10,657,802 B2 | 5/2020 | Guerin et al. |
| 10,671,088 B2 | 6/2020 | Lutz et al. |
| 2005/0221840 A1* | 10/2005 | Yamamoto ........... G05D 1/0246 455/456.3 |
| 2006/0184013 A1 | 8/2006 | Emanuel et al. |
| 2006/0241812 A1 | 10/2006 | Jung |
| 2012/0116588 A1 | 5/2012 | Lee et al. |
| 2012/0313779 A1* | 12/2012 | Papaefstathiou .... G05D 1/0038 340/540 |
| 2014/0100693 A1* | 4/2014 | Fong .................... A47L 9/2873 700/253 |
| 2014/0222271 A1* | 8/2014 | Merten ................... H02J 50/20 701/22 |
| 2014/0324271 A1* | 10/2014 | Oh ........................ G05D 1/0274 701/28 |
| 2015/0127954 A1 | 5/2015 | Rangadass et al. |
| 2015/0134115 A1 | 5/2015 | Gong et al. |
| 2015/0301588 A1 | 10/2015 | Jeong et al. |
| 2018/0246518 A1 | 8/2018 | Vogel et al. |
| 2018/0299899 A1* | 10/2018 | Suvarna ................ A47L 9/2894 |

FOREIGN PATENT DOCUMENTS

| | | |
|---|---|---|
| EP | 3 185 096 A1 | 6/2017 |
| WO | 2014/055966 A1 | 4/2014 |
| WO | 2017/037257 A1 | 3/2017 |

* cited by examiner

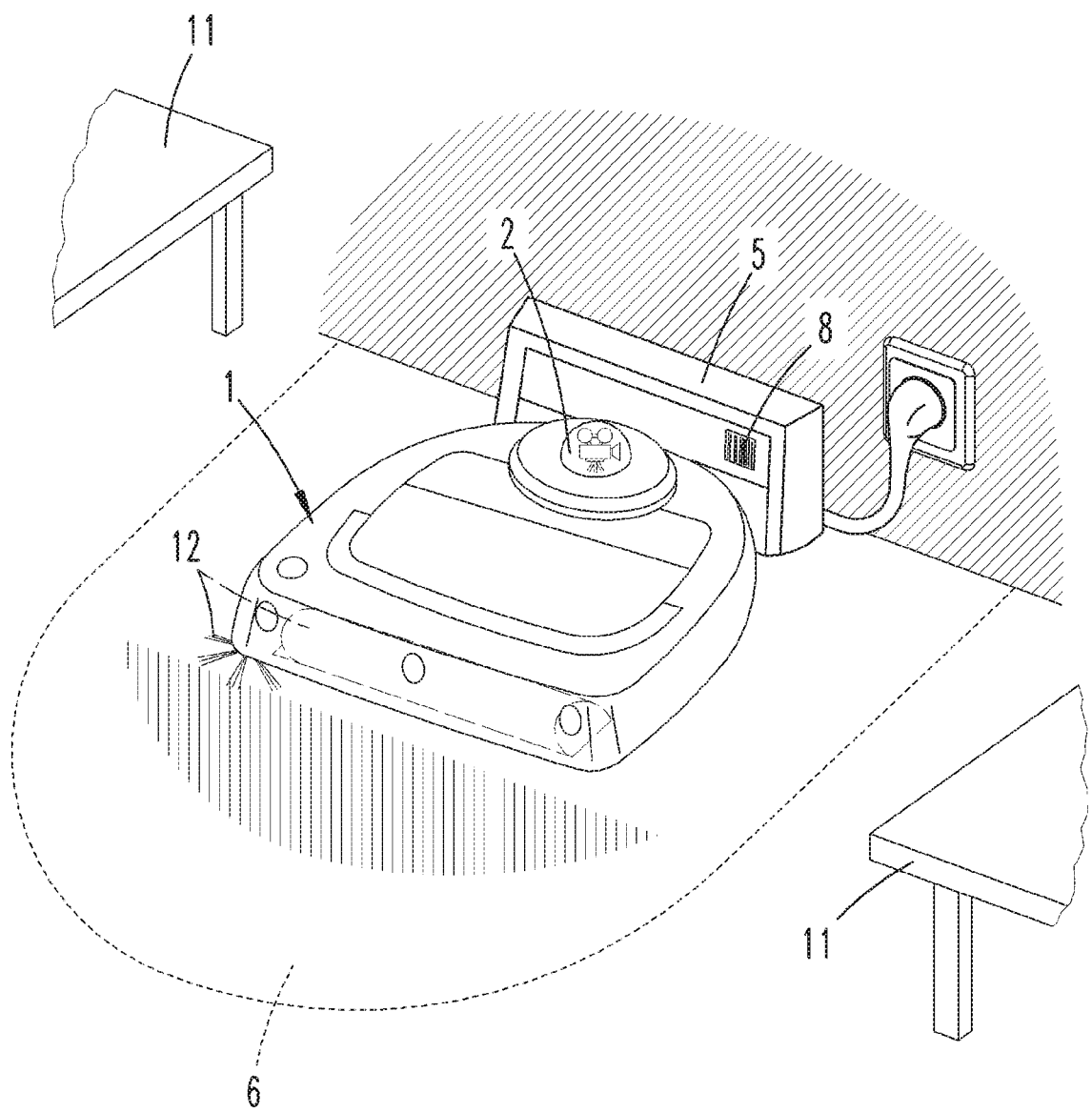

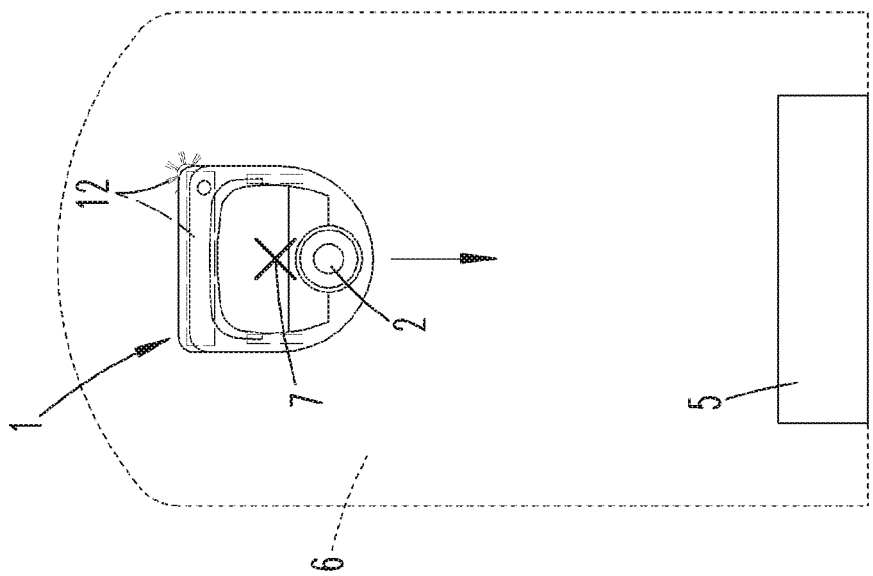
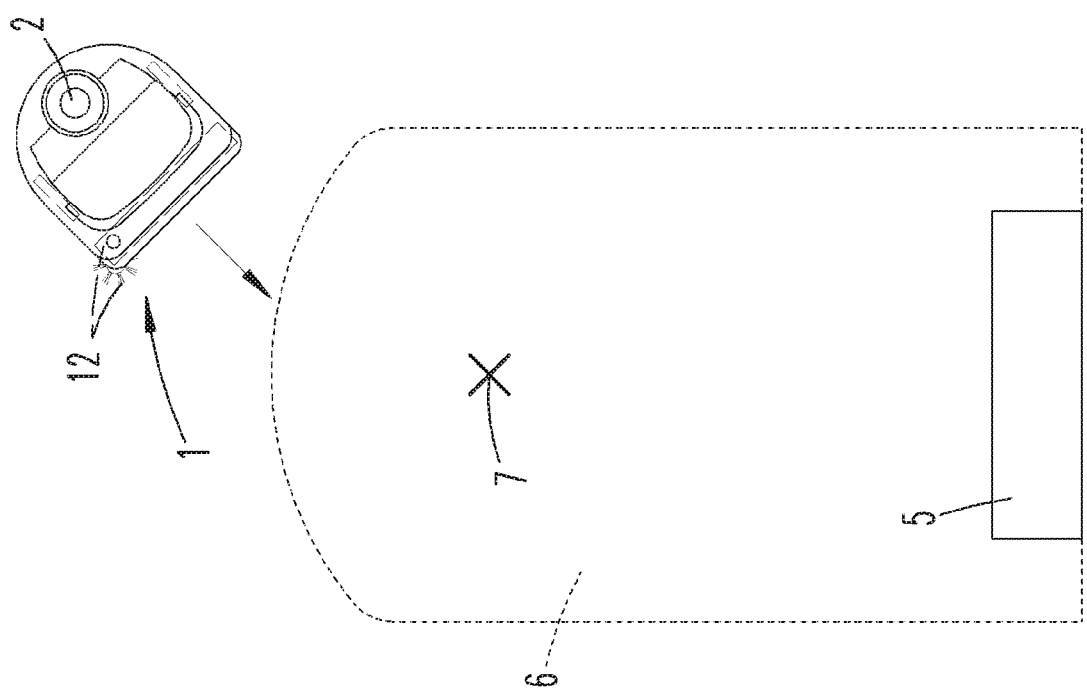

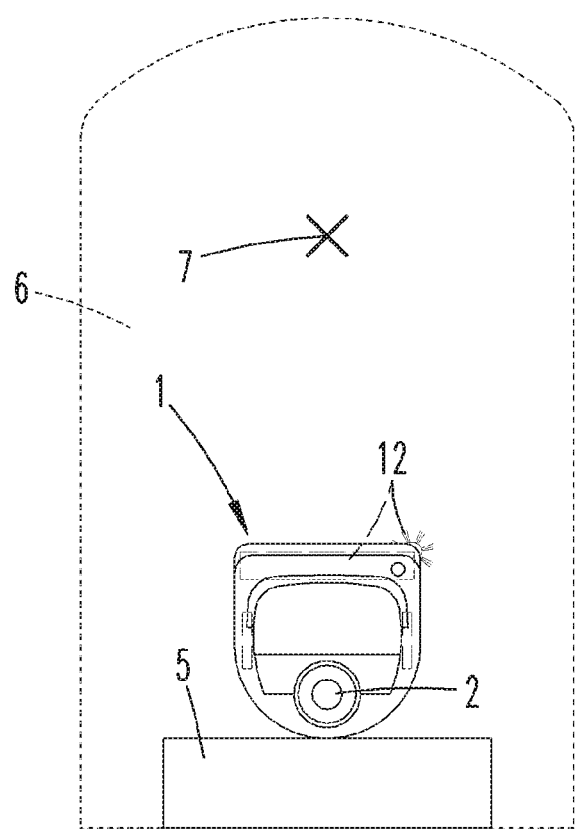

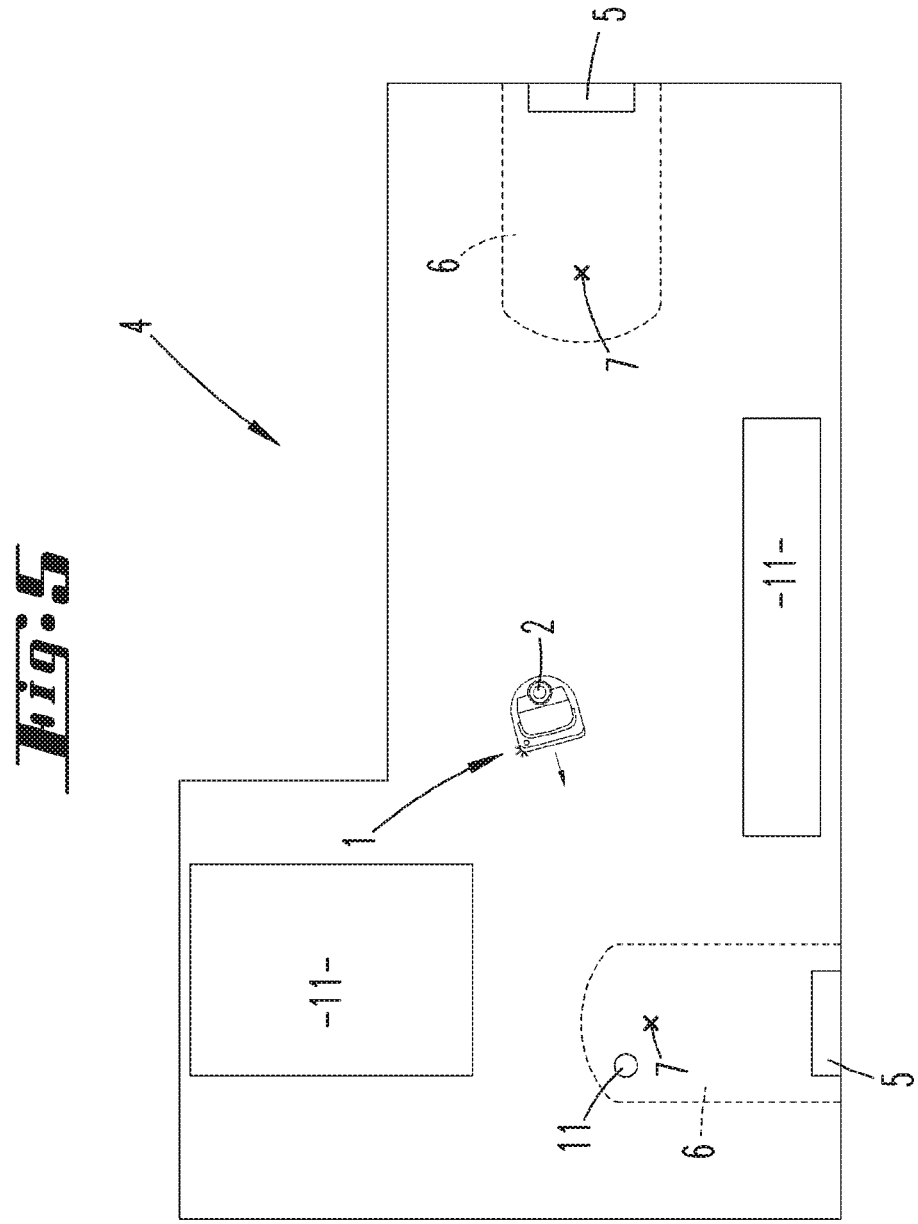

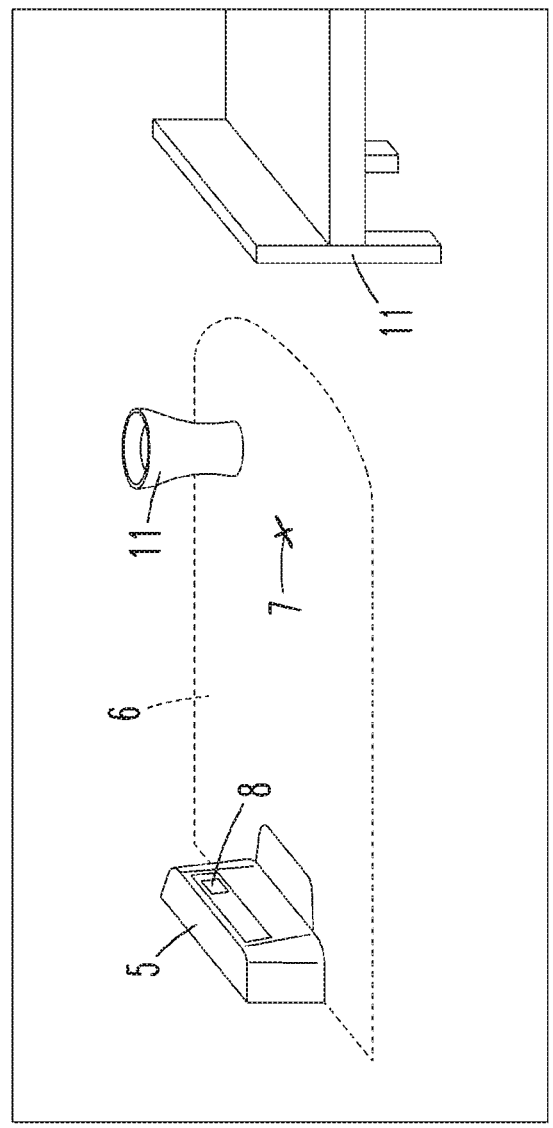

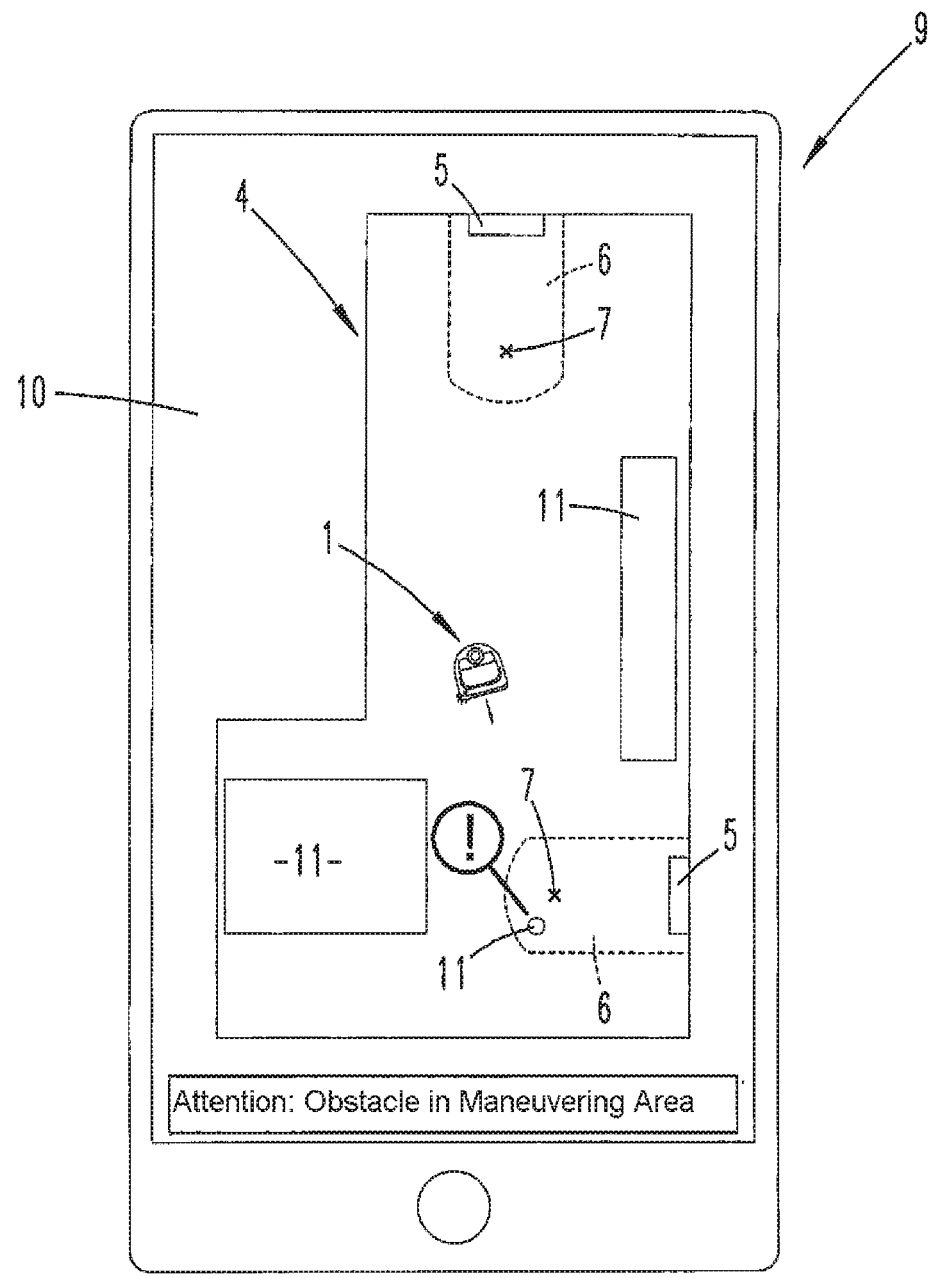

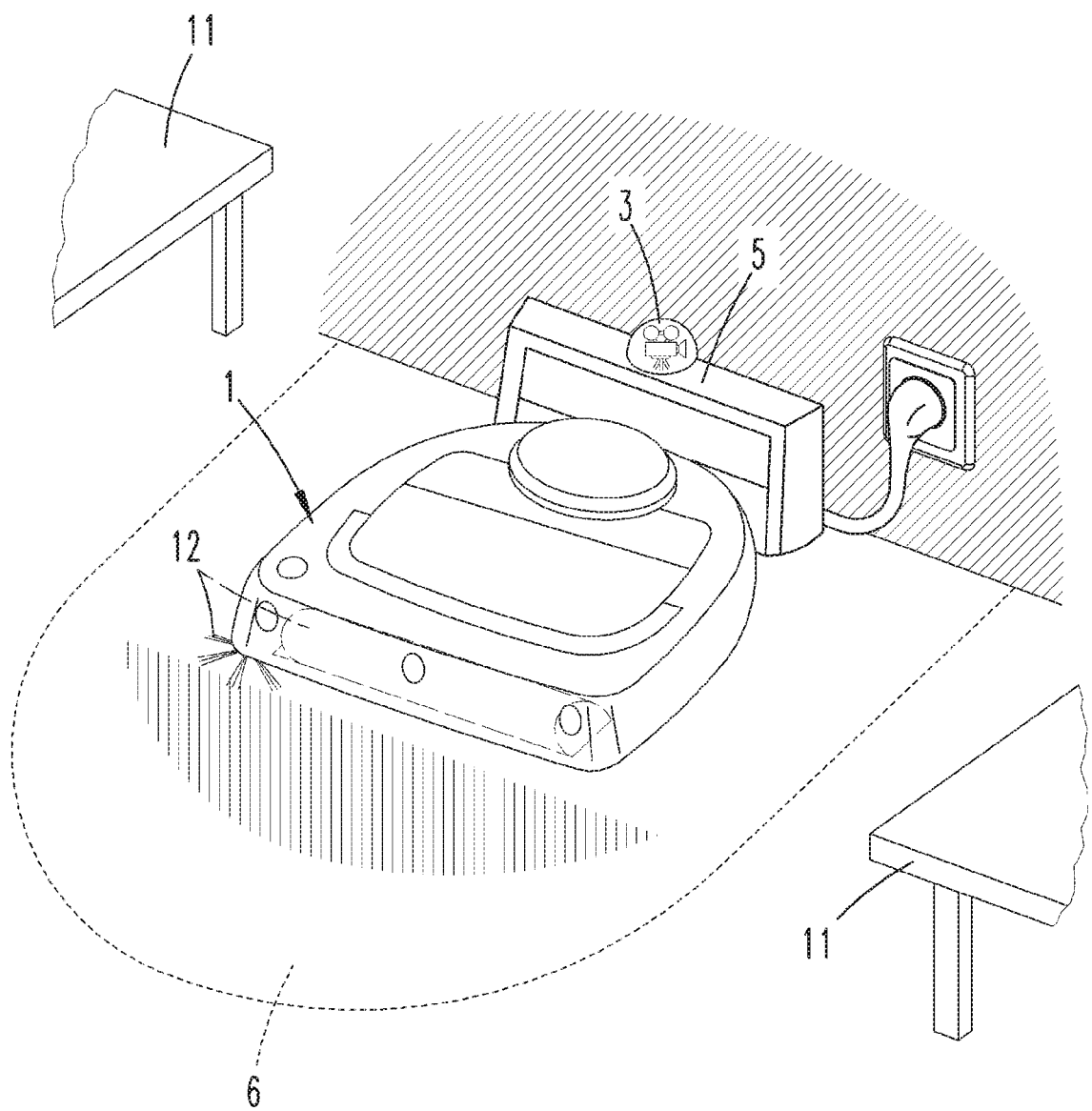

METHOD FOR OPERATING AN AUTOMATICALLY MOVING SERVICE DEVICE

CROSS REFERENCE TO RELATED APPLICATIONS

Applicant claims priority under 35 U.S.C. § 119 of German Application No. 10 2017 006 621.3 filed on Jul. 13, 2017 and German Application No. 10 2018 116 065.8 filed on Jul. 3, 2018, the disclosures of which are incorporated by reference.

The invention relates to a method for operating an automatically moving service device, wherein a detection device detects obstacles within an environment, wherein detection results of the detection device are used to generate an environment map of the environment, and wherein the service device moves within the environment based on the environment map, wherein a control device of the service device receives information about a spatial position of a base station in the environment, wherein a maneuvering area for the service device to approach, turn toward and/or dock with the base station is further determined.

PRIOR ART

Methods for operating automatically moving service devices are known in prior art.

Publications DE 10 2011 00 536 A1 and DE 10 2008 014 912 A1 show such methods, for example in conjunction with automatically movable cleaning robots for cleaning floors. However, these methods can also find application in other service devices, for example in automatically movable transport robots, lawnmower robots or the like. Such service devices are preferably equipped with distance sensors, for example so as to prevent a collision with an obstacle standing in the travel path. The distance sensors preferably work without contact, for example using light and/or ultrasound. It is further known to provide the robot with means for all-around distance measurement, for example in the form of an optical triangulation system, which is arranged on a platform that rotates around a vertical axis or the like. Such a system can be used to perform all-round distance measurements for orienting the service device within its environment, and further in particular during an automatically performed activity of the service device, as well as further preferably for generating an environment map of the traversed environment.

The detection results of the distance sensor are further processed into an environment map, and in particular stored in a nonvolatile memory of the service device, so that this environment map can be drawn upon during a cleaning and/or transport process for orientation purposes.

It is further known that the automatically moving service device can move toward a base station and there be docked, for example to charge an accumulator, empty a suction material container or receive other services at the base station. For this purpose, the service device approaches the base station over a maneuvering area, which lies before the docking area of the base station relative to a viewing direction of the service device. Since an accumulator and/or a suction material container can also be arranged in the rear area of the service device, it is also known in prior art that the service device turns by up to 180 degrees in the maneuvering area, so as to dock the rear of the device to the base station. The service device requires a space free of obstacles for both approaching and changing direction within the maneuvering area, so that it can dock with the base station in a provided sequence of movements.

If an obstacle that prevents the service device from approaching, turning and/or docking to the base station is located within the maneuvering area, the service device only detects this once the approach process within the maneuvering area has begun, and a detection device of the service device perceives the obstacle. If the service device is unable to dock with the base station, it remains standing in the last reached position. For example, this makes charging an accumulator impossible, so that the service device in the worst case scenario shuts down completely given a spent accumulator, and a previously stored travel route including a cleaning history is deleted from a working memory of the service device.

SUMMARY OF THE INVENTION

Therefore, proceeding from the aforementioned prior art, the object of the invention is to detect an obstacle in a maneuvering area of a base station early on, and thus ensure that a service device is properly docked with the base station.

In order to achieve the aforementioned object, the invention proposes that the spatial position and maneuvering area be stored in the environment map, wherein a turning point for a directional change is prescribed within the maneuvering area, wherein the service device, as it moves toward the base station, can execute a last directional change at this turning point at the latest and independently of the remaining progression of movement, before it moves along a straight line toward the base station.

As a result of the invention, the autonomous service device receives early knowledge about the presence of an obstacle within a maneuvering area located before a base station during an automatic movement. The information about the presence of an obstacle can then be used to change a navigation toward a base station. The detection device is here designed to detect at least a partial area of the environment of the service device, to include in particular a position of one or several base stations within the environment. As soon as the position of the at least one base station is known, the maneuvering area of the at least one base station can be monitored. For example, both the position of the base station and the maneuvering area and/or a turning point at which the service device turns before the base station, i.e., changes its direction, can be defined by XY-coordinates and/or a set-up angle of the base station relative to spatial limitations within the environment. The directional change can involve a turning by up to 180 degrees, so that the service device approaches the base station with its rear area, for example. According to the invention, a turning point for a directional change is defined within the maneuvering area. The maneuvering area can prescribe not just a single turning point, but also several turning points for a directional change. The turning point or turning points define the position within the maneuvering area at which the service device must execute a necessary directional change at the latest on its movement path toward the base station, before moving along a straight line toward the base station. As a consequence, a straight line for the continued movement of the service device is prescribed between the turning point and the base station, so that the service device, after having passed the turning point, approaches the base station in a directed manner, if necessary allowing for a defined angular range. The turning point is defined for both smaller directional changes of a few degrees, as well as for turning maneuvers of around 180 degrees. In this regard, there is a specific position within the maneuvering area for both service devices that approach the base station with a front area and service devices that dock with the base station in reverse, specifically the turning point at which the service device implements a final correction of its movement, and then travels along a straight line toward the base station without any other directional changes. The directional change implemented at the turning point can involve changes up to a complete reversal of the direction of movement. The size and position of the maneuvering area is preferably defined by the position and set-up angle of the base station. When monitoring the maneuvering area, both the position of the base station and the presence of an obstacle in the maneuvering area for a possible docking process of the service device are detected. Monitoring can preferably take place continuously or in specific time intervals during a movement and/or service activity of the service device within the environment. In particular so early on that the service device has not yet started an approach or docking process for docking with the base station. In particular, the sequence of the method according to the invention is such that the detection device first detects the presence of a base station within the environment, after which the position of the base station in the environment is determined, in particular as defined by XY-coordinates and/or a set-up angle of the base station within the environment. In addition, the method involves placing a model for an approach, turning or docking movement of the service device into the environment map proceeding from a current position of the service device, wherein in particular the maneuvering area and/or turning point of the service device is considered. The maneuvering area is subsequently monitored, in particular as relates to a potential collision with an obstacle, wherein monitoring takes place continuously or situationally before a docking request by the service device. The environment map can be generated and the base station and maneuvering area can be entered into the environment map within the service device itself or in the base station or an external device, which has a corresponding memory and a computing device suitable for this purpose.

It is further proposed that the information about the spatial position of the base station be detected by means of a detection device of the service device. In this embodiment, the service device itself detects whether obstacles are present in the maneuvering area of the base station. In particular, the detection device of the service device can be an image acquisition device, for example a camera and/or a CCD-chip or CMOS-chip. In addition, the service device can have a computing device, which evaluates the images recorded by the detection device to determine whether a base station is in the environment. The position of the base station can then be determined based on an image comparison.

It can further be provided that the position of the base station be determined while the service device is connected with the base station, wherein the position is determined in particular based on a location of the service device at a starting time for a movement by the service device that begins at the base station. In this embodiment, the starting point for a cleaning process of the service device is determined while the service device is located at the base station. A detection device of the service device recognizes that the service device is currently located at the base station, and defines its current position within the environment as a spatial position of the base station, possibly corrected by a factor that indicates a measure for the position of the service device relative to the base station in the docked state.

It can further be provided that a detection device of the service device recognizes the base station based upon a code arranged on the base station, wherein the code has information about the base station, and wherein the detection device in particular is a laser scanning device or image acquisition device that optically detects the code. For this purpose, the base station has a code, in particular an optical code. For example, this code can be a QR-code, a barcode or some other visual code that can be read out and recognized by means of the detection device of the service device. The content of the code relates to one or several items of information of the base station, for example information indicating that a base station is involved and/or information about the type of base station, and possibly also information about the current set-up angle and/or current position of the base station within the environment.

It can alternatively be provided that a user transmit the information about the spatial position of the base station to the service device. The user can here transmit the information to the service device in particular manually via a communications link to the external terminal device having the service device. In an especially simple embodiment, it is possible for the user to enter the information directly into the service device by way of an input interface, for example a keyboard or touchscreen, of the service device. In addition, an external terminal device of the user can also be used to this end, for example a mobile phone, a tablet computer, a laptop, a PC and the like. The external terminal device can preferably communicate wirelessly with the service device, for example via WLAN, BLUETOOTH® short range radio frequency wireless connection, ZigBee or the like. However, hardwired communication is also possible.

It is proposed that the user enter the position of the base station in an environment map shown on a display of the external terminal device. Installed on the external terminal device of the user is an application that displays the environment map and allows the user to change and/or supplement the environment map, in particular in such way that the user enters the position of the base station via a keyboard, for example in the form of X-, Y-coordinates, or directly via a touchscreen that shows the environment map.

It is further proposed that the maneuvering area be monitored in relation to an obstacle present herein by means of the detection device of a service device and/or by means of a detection device of the base station. The detection device of the service device can thus itself detect obstacles on the one hand, as alternatively or additionally can a detection device of the base station on the other, which is also preferably an image acquisition device. It is here especially advantageous that the detection device of the base station can be directly and permanently aimed at the maneuvering area before the base station. The detection results recorded by the detection device of the base station can then be made available to the service device. The service device can further process these detection results, and in particular also enter them into the environment map or use them to inform a user about the presence of an obstacle.

It can further be provided that the maneuvering area be monitored chronologically before a starting time of a maneuvering process for having the service device approach, turn and/or dock with the base station. In particular, the maneuvering area can be monitored once a movement of the service device has ended, and/or when a critical threshold for a charging state of an accumulator of the service device has been dropped below, and/or when an instruction has been received from a user of the service device. Monitoring of the maneuvering area can basically take place as soon as the position of the base station within the environment is known. The service device or its detection device or also the detection device of the base station can monitor the maneuvering area continuously, or as proposed, especially before the service device starts the process of approaching and/or docking with the base station, so that a conflict situation for the navigation process of the service device can be recognized early on, and the user can still intervene in time to remove the obstacle before the service device undesirably stops. As proposed, it is conceivable that the maneuvering area be checked for obstacles once, for example rightly before docking. The check is here triggered by the end of a service operation, for example after a cleaning activity of the service device has ended, once a threshold for the charging state of the accumulator of the service device has been reached which requires that the service operation be interrupted and the accumulator be charged and/or a manual command from a user, for example a command for terminating a cleaning process of the service device.

In particular, it is proposed that, once an obstacle has been detected in the maneuvering area of a base station, it be determined whether other base stations are available in the environment with which the service device can dock. In addition, it can be provided that, once an obstacle has been detected in the maneuvering area of the base station, acoustic and/or optical information about the obstacle be transmitted to a user of the service device, in particular to an external terminal device of the user. Various procedures of the service device can be initiated upon detection of an obstacle; for example information can be transmitted to the user of the service device in response to a conflict situation, e.g., by means of an application installed on an external terminal device, by displaying a cutout of the environment map with the position of an obstacle and/or an image of the obstacle recorded by a detection device of the service device or base station. In addition, an acoustic and/or optical signal can be transmitted to the user, whose contents indicate that the obstacle should be removed from the maneuvering area. For example, the indication can be depicted in writing on a display of the external terminal device of the user, output over a loudspeaker of the external terminal device, base station or service device, or the like. In addition, a response to a detected conflict situation can involve initially waiting and checking whether the obstacle has again absented itself from the maneuvering area. For example, this can be the case if the user manually removes the obstacle, or if the obstacle was a human or pet, who or which had been in the maneuvering area of the base station. Should the latter be the case, updated information is output to the user, with contents indicating that the conflict situation has been resolved. As another possibility, it can be provided that a computing unit of the service device, base station or an external terminal device check whether several base stations are present in the environment of the service device, wherein if several base stations are actually present, it can be detected which base station lies closest to the service device and offers a free maneuvering area without any obstacles being present there, so that the service device could dock there without a collision.

Finally, it is proposed that the environment map and obstacles stored therein be used to determine an optimal spatial position for a base station, wherein information about the optimal spatial position is transmitted to the user of the service device. The analysis of historical environment maps along with stored conflict situations within various areas in the environment makes it possible to give the user recommendations for a suitable installation site of the base station. To this end, for example, the map data of several consecutive service runs, for example cleaning passes, of the service device can be analyzed, so as to determine whether collisions with obstacles are or were also encountered at similar locations in the room. For example, the notification as to the optimal spatial position can be transmitted to a user by the service device itself, by a base station or also by an external terminal device of the user.

On the whole, the invention provides the user with early information about a possible collision with obstacles during the process of docking with a base station. By continuously monitoring the maneuvering area of one or several base stations, the user can act early on, so that an accumulator can be prevented from completely discharging, and operation can be continued without any further action by the user after docking and charging on the base station.

BRIEF DESCRIPTION OF THE DRAWINGS

The invention will be explained in more detail below based on exemplary embodiments. Shown on:

FIG. 1 is an environment with a service device docked with a base station,

FIG. 2 is a maneuvering area of the base station with a service device before traversing the maneuvering area, FIG. 3 is the situation according to FIG. 2 while turning the service device within the maneuvering area, FIG. 4 is the situation according to FIGS. 2 and 3 with the service device in a docked state with the base station, FIG. 5 is an environment map of the environment, FIG. 6 is a partial area of the environment with an obstacle located in the maneuvering area of the base station, FIG. 7 is an external terminal device, on which an environment is displayed, FIG. 8 is an environment with a service device and a base station according to a second embodiment.

DESCRIPTION OF THE EMBODIMENTS

FIG. 1 shows a partial area of an environment with a base station 5 and a service device 1 docked therewith. For example, the service device 1 is here an automatically moving cleaning robot. In addition, a plurality of obstacles 11 are located in the environment, here for example pieces of furniture. The service device 1 has a housing, the bottom of which facing a surface to be cleaned has electric motor-driven wheels (not shown) as well as a cleaning element 12 that protrudes over the lower edge of a housing floor, which is likewise driven by an electric motor. For example, the cleaning element 12 is here a rotating side brush of the service device 1. Additional cleaning elements 12 can further be arranged hidden underneath the housing of the service device 1, for example a rotating bristle roller or the like. In addition, the service device 1 has a suction nozzle opening in the area of the cleaning element 12 (not shown in any more detail), with which air loaded with suction material can be sucked into the service device 1 by means of a motor-blower unit. The service device 1 has a rechargeable accumulator (not shown) for supplying power to the individual electrical components of the service device 1, for example for driving the wheels and cleaning elements 12, along with additionally provided electronics.

The service device 1 is further equipped with a detection device 2, which on the one hand has an image acquisition device, here a camera, and on the other a triangulation measuring device arranged inside of the housing of the service device 1, which can measure distances from the obstacles 11 within the environment of the service device 1. For example, the triangulation measuring device specifically has a laser diode, whose emitted light beam can, by means of a deflection device, be guided out of the service device 1 and rotated around a rotational axis that is perpendicular in the depicted orientation of the service device 1, in particular at a measuring angle of 360°. This enables an all-round distance measurement.

The detection device 2 can be used to measure and monitor an environment of the service device. In particular, the service device 1 can be moved while avoiding a collision with obstacles 11 in the environment. The detection results recorded by means of the detection device 2, which relate to distances from obstacles 11 in the environment, are used for generating an environment map 4 of the environment.

Located in front of the base station 5 is a maneuvering area 6, in which the service device 1 approaches the base station 5 for a docking process. The service device 1 turns within the maneuvering area 6, so that the service device 1 here approaches the base station 5 with its rear area, for example, so as to there charge an accumulator, for example. In order to arrive at the docking position shown on the figure, the service device 1 turns at a turning point 7 defined in the maneuvering area 6 (see FIGS. 2 to 4), which lies a predefined distance away from the base station. As a result, the service device 1 can dock with the base station 5 after turning by traveling in reverse. Alternative embodiments can likewise provide that the suction device 1 dock with the base station 5 while moving sideways or forward, so that the angle of directional change at the turning point 7 differs accordingly.

As depicted on FIG. 1, a code 8 containing information about the base station 5 is further located outside on the base station 5. This code can be detected and read out by the detection device 2 of the service device 1. For example, the code 8 contains information that the base station 5 is a base station 5 suitable for the service device 1.

FIGS. 2 to 4 show the chronological progression of a docking process for docking the service device 1 with the base station 5. FIG. 2 here shows a process in which the service device 1 approaches the maneuvering area 6 of the base station 5. The service device 1 here is still located outside of the maneuvering area 6, and heads for the turning point 7 defined within the maneuvering area 6. The position of the maneuvering area 6 as well as the turning point 7 located therein are calculated based on the known position and orientation of the base station 5 within the environment map 4. A model of a traveling path for the service device 1 for docking with the base station 5 is placed in the environment map 4, wherein the turning point 7 for the service device 1 at which the service device 1 preferably turns is simultaneously calculated, so that it can dock with the base station 5 over the shortest and/or simplest path, whether forward, sideways, or—as shown here—in reverse. Of course, it is also possible that a service device 1 not have to turn in order to dock with the base station 5. In this case, the turning point 7 within the maneuvering area 6 is omitted. For example, the position of the base station 5 within the environment was previously determined proceeding from the base station 5 while starting up a service run of the service device 1. However, it is further also possible for a user of the service device 1 to have manually transmitted the position of the base station 5 to the service device 1 beforehand, in particular to have manually entered it into the environment map 4. As a consequence, the service device 1 knows both a current position of the service device 1 within the environment, as well as the position of the base station 5 and its maneuvering area 6. The turning point 7 here marks the point within the maneuvering area 6 at which the suction device 1 must implement a change in direction at the latest as it moves toward the base station 5, so as to then head toward the base station 5 along a straight line. FIG. 3 shows a situation in which the service device 1 is already located within the maneuvering area 6, specifically above the defined turning point 7. The service device 1 has already turned, and now travels—proceeding from the turning point 7—in reverse toward the base station 5. Finally, the docking position of the service device 1 shown on FIG. 4 is reached.

FIG. 5 depicts an environment map 4 showing the environment of the service device 1. Both the obstacles 11 and several base stations 5 are stored in the environment map 4. In addition, the environment map 4 also contains the position of the service device 1. The maneuvering areas 6 for the two respective base stations 5 and the accompanying turning points are also stored. An obstacle 11 within the maneuvering area 6 belonging to the base station 5 is further arranged in the environment map 4 before one of the two base stations 5. For example, the obstacle 11 is here a vase, which the user inadvertently placed within the maneuvering area 6. FIG. 6 also shows a detailed cutout of the situation.

The detection device 2 of the service device 1 continuously monitors the maneuvering area 6 during a cleaning activity within the environment, and recognizes a change within the maneuvering area 6 by means of the detection device 2, specifically either with the image acquisition device during a comparison with reference images without an obstacle 11, or with the distance measuring device. As soon as the detection device 2 has discovered an obstacle 11 in the maneuvering area 6, the service device 1 outputs information to a user of the service device 1. The information can be output either acoustically via an announcement to the effect that the user should remove an obstacle 11 from the maneuvering area 6 of the base station 5, or in the form of optical information, which is shown in particular on a display 10 of an external terminal device 9. Such an optical display of information is depicted on FIG. 7, for example. Illustrated therein is an external terminal device 9, here a mobile phone, whose display 10 shows the environment map 4 of the environment. The environment map 4 here corresponds to the environment map shown on FIG. 5. The latter has been additionally supplemented with the information "Attention. Obstacle in maneuvering area". Furthermore, an optical marker, specifically an exclamation point, is located within the environment map 4, allocated to the maneuvering area 6 of the respective base station 5, so that the user can immediately recognize where the obstacle 11 is located. The user can thereupon go to the maneuvering area 6 within the environment and remove the obstacle 11.

As an alternative to a continuous monitoring of the maneuvering area 6 of the base stations 5, it can be provided that the service device 1 only checks the maneuvering areas 6 situationally, specifically when the plan is to have the service device 1 approach a base station 5, either soon or right now. For example, this might be the case toward the end of a service run of the service device 1, when the accumulator of the service device 1 only has a slight charging voltage, or if the user manually transmits a control command for docking with a base station 5. If the detection device 2 of the service device 1 detects the presence of an obstacle 11 within the maneuvering area 6 as in the example shown, the information about the obstacle 11 can be transmitted to the user. The information can here have the displayed environment map 4 on the one hand, but also an image of the environment showing the obstacle 11, for example. The service device 1 thereupon preferably waits and checks whether the obstacle 11 absents itself from the maneuvering area 6, for example because the obstacle 11 is a person or an animal, or because the user has manually removed the obstacle 11. If the service device 1 determines that the obstacle 11 has again been removed, information is also output to the user accordingly. In addition, in the event that an obstacle 11 is present within a maneuvering area 6 of one of the base stations 5, it can be provided that the service device 1 check whether other base stations 5 are available within the environment of the service device 1 for docking purposes. The service device 1 can then head for an alternative base station 5 and there dock.

Finally, FIG. 8 shows another embodiment of the invention, in which the base station 5 has a detection device 3. This detection device 3 is here also an image acquisition device, specifically a camera. The detection device 3 monitors the maneuvering area 6 of the respective base station 5 in relation to obstacles 11 present therein. Should the detection device 3 of this base station 5 discover that an obstacle 11 is located within the maneuvering area 6, a corresponding notification can be transmitted to a user, so that the latter can remove the obstacle 11 from the maneuvering area 6.

In addition, it can be provided that an advantageous spatial position be recommended to a user for setting up a base station 5 within the environment. For this purpose, historical environment maps can be analyzed, and any obstacle situations identified earlier in specific partial areas of the environment can be evaluated. The recommended suitable installation site for one or more base stations can in turn be displayed for the user on an external terminal device 9.

REFERENCE LIST

1 Service device
2 Detection device
3 Detection device
4 Environment map
5 Base station
6 Maneuvering area
7 Turning point
8 Code
9 External terminal device
10 Display
11 Obstacle
12 Cleaning element

The invention claimed is:

1. A method for operating an automatically moving service device (1), comprising detecting obstacles (11) within an environment with a detection device (2,3), generating an environment map (4) of the environment using detection results of the detection device (2,3), and moving the service device (1) within the environment based on the environment map (4),
wherein a control device of the service device (1) receives information about a spatial position of a base station (5) in the environment,
wherein a maneuvering area (6) for the service device (1) to approach, turn toward and/or dock with the base station (5) is further determined before a maneuvering process of the service device (1) with the base station (5) starts,
wherein the spatial position and maneuvering area (6) are stored in the environment map (4),
wherein a turning point (7) for a directional change is prescribed within the maneuvering area (6) before the maneuvering process of the service device (1) with the base station (5) starts,
wherein as the service device (1), moves toward the base station (5), the service device executes a last directional change at this turning point (7) at the latest and independently of a remaining progression of movement, before the service device moves along a straight line toward the base station (5),
wherein the maneuvering area (6), with regard to the presence of an obstacle (11), is monitored chronologically before a starting time of a maneuvering process for having the service device approach, turn and/or dock with the base station (5),
wherein the monitoring takes place continuously during a movement and/or service activity of the service device (1) within the environment, or wherein the monitoring is triggered by an end of a service operation of the service device, the end of the service operation being defined as one of the following: after a cleaning activity of the service device has ended, or once a movement of the service device (1) has ended, or when a critical threshold for a charging state of an accumulator of the service device (1) has been dropped below a level that requires the service operation to be interrupted and the accumulator be charged, or when an instruction for terminating a cleaning process of the service device (1) has been received from a user of the service device (1),
wherein the maneuvering area (6) is monitored before the starting time of the maneuvering process in relation to an obstacle (11) present in the maneuvering area (6) by means of the detection device, wherein the detection device is a detection device (3) of the base station (5),
wherein the detection device (3) of the base station (5) is directly and permanently aimed at the maneuvering area (6) before the base station (5), wherein the base station (5) makes the detection results recorded by the detection device (3) available to the service device (1), and wherein the service device (1) processes the detection results further and enters them into the environmental map.

2. The method according to claim 1, wherein the information about the spatial position of the base station (5) is detected by means of the detection device (2), and wherein the detection device is a detection device of the service device (1).

3. The method according to claim 2, wherein the position of the base station (5) is determined while the service device (1) is connected with the base station (5), wherein the position is determined in particular based on a location of the service device (1) at a starting time for a movement by the service device (1) that begins at the base station (5).

4. The method according to claim 1, wherein a detection device (2) of the service device (1) recognizes the base station (5) based upon a code arranged on the base station (5).

5. The method according to claim 1, wherein a user transmits the information about the spatial position of the base station (5) to the service device (1), in particular manually via a communications link to an external terminal device (9) having the service device (1).

6. The method according to claim 5, wherein the user enters the position of the base station (5) in an environment map (4) shown on a display (10) of the external terminal device (9).

7. The method according to claim 1, wherein, once an obstacle (11) has been detected in the maneuvering area (6) of a base station (5), it is determined whether other base stations (5) are available in the environment with which the service device (1) can dock.

8. The method according to claim 1, wherein the environment map (4) and obstacles (11) stored therein are used to determine an optimal spatial position for a base station (5), wherein information about the optimal spatial position is transmitted to the user of the service device (1).

* * * * *